No. 615,565. Patented Dec. 6, 1898.
H. MARSH.
ADJUSTABLE HANDLE FOR DUST PANS.
(Application filed Aug. 17, 1898.)
(No Model.)
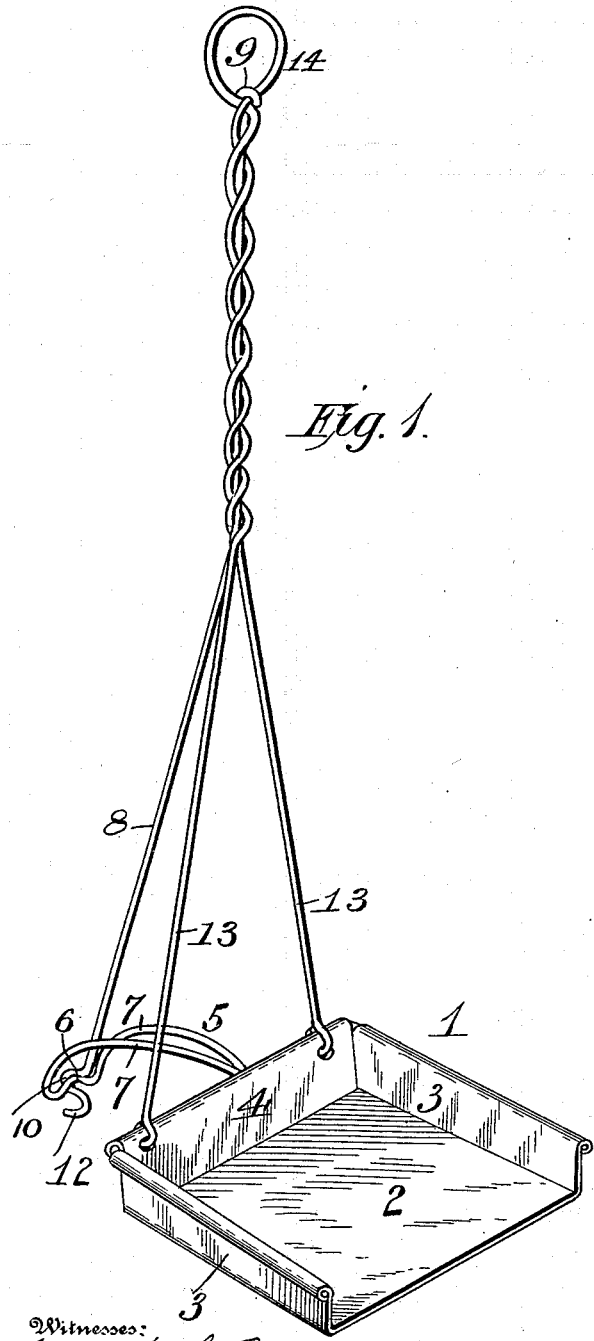
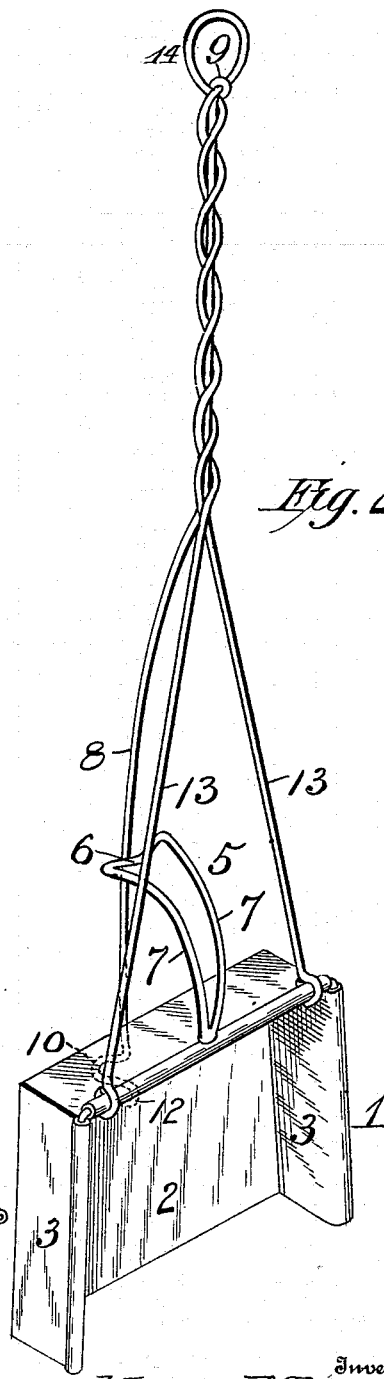

UNITED STATES PATENT OFFICE.

HENRY MARSH, OF FRANKFORT, NEW YORK.

ADJUSTABLE HANDLE FOR DUST-PANS.

SPECIFICATION forming part of Letters Patent No. 615,565, dated December 6, 1898.

Application filed August 17, 1898. Serial No. 688,797. (No model.)

*To all whom it may concern:*

Be it known that I, HENRY MARSH, a citizen of the United States, residing at Frankfort, in the county of Herkimer and State of New York, have invented new and useful Improvements in Adjustable Handles for Dust-Pans, of which the following is a specification.

My invention relates to dust-pans; and its object is to provide an improved construction of the same by which the operator is relieved from stooping when the pan is in use.

The invention consists, essentially, in a dust-pan having upwardly-extending sides and back, a rearwardly-extending curved guide-arm having a bend at the outer end, a handle pivotally connected with said pan, and a spring-rod secured to said handle provided with a bend at the lower end adapted to engage with the bend of said guide-arm for holding the pan at a right angle to the handle, as hereinafter fully described and claimed.

In the accompanying drawings, Figure 1 is a perspective view showing my device as it appears in use. Fig. 2 is a similar view showing the inclined rod and guide-arm disconnected and the pan dropped down to empty the contents.

In the said drawings the reference-numeral 1 designates the pan comprising the bottom 2, the upwardly-extending sides 3, and the rear upwardly-extending wall 4. Secured to the upper edge of said rear wall is a rearwardly-extending curved guide 5, consisting of a piece of wire of suitable length bent over at the center, forming a bend 6 and two arms 7, the front ends of which are secured to said wall 4.

The numeral 8 designates a spring-metal inclined rod having its upper end bent into a hook 9 and near its lower end formed with a bend 10, adapted to engage with the bend 6 of the guide. The lower extremity of this rod is bent forwardly and then rearwardly, forming a lug 12, adapted to rest on the floor when the device is in use.

The numeral 13 designates two metal arms which constitute the handle of the pan. These arms consist of a single piece of wire bent at the center to form a loop 14 and then twisted around the rod 8. The lower ends of these arms are pivotally connected with the rear wall of the pan.

In use the bend in the guide-arm engages with the bend in the spring-rod and holds the pan at a right angle to the handle, so that the user will not have to stoop in sweeping dust and trash onto the pan. The pan can also be carried from place to place without liability of spilling the contents, and when it is desired to dump the load it is only necessary to pull the rod outward, disengaging its bend from the bend of the guide-arm, when the pan will drop down, turning on the ends of the handles, which form pivots therefor.

Having thus fully described my invention, what I claim is—

1. The combination with a dust-pan provided with a rearwardly-extending curved guide formed with a bend at the rear end, of the spring-rod formed with a bend adapted to engage with the bend of said rod and the handle pivoted to said pan and having the upper ends twisted around said rod, substantially as described.

2. The combination with a dust-pan provided with a rearwardly-extending guide formed with a bend at the rear end, of the spring-rod provided with a ring at the upper end and at the lower end formed with a bend and a lug, and the handle consisting of the arms pivoted to said pan and twisted around said rod, substantially as described.

In testimony whereof I have hereunto set my hand in presence of two subscribing witnesses.

HENRY MARSH.

Witnesses:
H. H. INGHAM,
HELEN C. INGHAM.